United States Patent Office 2,893,959
Patented July 7, 1959

2,893,959

LUBRICANT COMPOSITION HAVING NON-RUSTING AND DETERGENCY PROPERTIES

Ellis K. Fields, Chicago, Ill., assignor to Standard Oil Company, Chicago, Ill., a corporation of Indiana No Drawing. Application November 29, 1956
Serial No. 624,962

7 Claims. (Cl. 252—32.7)

This invention relates to improvements in lubricant compositions, and more particularly pertains to improvements in motor oil compositions exhibiting non-rusting and detergency properties.

Most modern automobile engines are designed with hydraulic valve-lifters for smoother and more efficient engine operation. Because of the small clearances between the plunger and the barrel of the hydraulic valve-lifters, very small amounts of deposits such as varnish and/or rust may cause sticking of the valve-lifter, and interfere with the smooth operation of the engine. To avoid or overcome the formation of varnish and/or rust in the hydraulic valve-lifter system, it has been the practice to incorporate in motor oils a detergent-type additive and an anti-rust additive.

It is an object of this invention to provide a motor oil additive having both detergent and anti-rust properties. Another object of the invention is to provide a lubricating oil composition having detergency and rust-inhibiting characteristics. Other objects and advantages of the invention will become apparent from the following description thereof.

In accordance with the present invention, the above objects are attained by employing a composition comprising a major proportion of a normally liquid oleaginous lubricant vehicle and from about 0.5% to about 20%, preferably from about 2% to about 10% of an oil-soluble alkaline earth-containing neutralized acidic composition consisting of a mixture of from about 80–90% of a hydrolyzed reaction product of a phosphorus sulfide and a hydrocarbon, other than a medial olefin, and from about 10% to about 20% of a hydrolyzed reaction product of a phosphorus sulfide and a medial olefin having the general formula

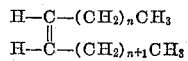

wherein $n$ is an integer of 8 to 20 inclusive.

The medial olefins consist of two long straight hydrocarbon chains coming from each end of a carbon to carbon double bond, as above illustrated. Such olefins can be prepared by the catalytic decarboxylation of long chain fatty acids to give the corresponding ketone which is then reduced to the carbinol and dehydrated. Specific examples illustrating medial olefins are 11-tricosene, 9-nonadecene, 13-heptacosene, 17-pentatriacontene, etc.

The hydrocarbons, other than the medial olefins, which are reacted with the phosphorus sulfide can be olefins, olefin polymers, aromatics, alkyl aromatics, alicyclic aliphatics, paraffins, petroleum fractions, such as lubricating oil fractions, waxes, solvent extracts of petroleum fractions, etc., as disclosed in U.S. 2,316,082 issued to C. M. Loane et al. April 6, 1943. As taught in this patent, the preferred hydrocarbon constituent of the reaction is a mono-olefin hydrocarbon polymer resulting from the polymerization of low molecular weight mono-olefin hydrocarbons, such propylene, butenes, amylenes or copolymers thereof. Such polymers may be obtained by the polymerization of mono-olefins of less than 6 carbon atoms in the presence of a catalyst, such as sulfuric acid, phosphoric acid, boron fluoride, aluminum chloride, or other similar halide catalysts of the Friedel-Crafts type.

The polymers employed are preferably mono-olefin polymers or mixtures of mono-olefin polymers and iso-mono-olefin polymers having molecular weights ranging from about 150 to 50,000 or more and preferably from about 500 to about 10,000. Such polymers can be obtained, for example, by the polymerization in the liquid phase of a hydrocarbon mixture containing mono- and iso-mono-olefins, such as butylene and isobutylene, at a temperature of from about −8° F. to about 100° F. in the presence of a metal halide catalyst of the Friedel-Crafts type, such as, for example, boron fluoride, aluminum chloride, and the like. In the preparation of these polymers, a hydrocarbon mixture containing isobutylene, butylenes and butanes recovered from petroleum gases, especially those gases produced in the cracking of petroleum oils in the manufacture of gasoline, can be used.

Another suitable polymer is that obtained by polymerizing in the liquid phase a hydrocarbon mixture comprising substantially $C_3$ hydrocarbons in the presence of an aluminum chloride-complex catalyst. The catalyst is preferably prepared by heating aluminum chloride with iso-octane. The hydrocarbon mixture is introduced into the bottom of the reactor and passed upward through the catalyst layer, while a temperature of from about 50° F. to about 110° F. is maintained in the reactor. The propane and other saturated gases pass through the catalyst, while the propylene is polymerized under these conditions. The propylene polymer can be fractionated to any desired molecular weight, preferably from about 500 to about 1000 or higher.

Other suitable polymers are those obtained by polymerizing a hydrocarbon mixture containing about 10% to about 25% isobutylene at a temperature of from about 0° F. to about 100° F., and preferably 0° F. to about 32° F., in the presence of boron fluoride. After the polymerization of the isobutylene, together with a relatively minor amount of the normal olefins present, the reaction mass is neutralized, washed free of acidic substances, and the unreacted hydrocarbons subsequently separated from the polymers by distillation. The polymer mixture so obtained, depending upon the temperature of reaction, varies in consistency from a light liquid to a viscous oily material and contains polymers having molecular weights ranging from about 100 to about 2,000 or higher. The polymers so obtained may be used as such or the polymer may be fractionated under reduced pressure into fractions of increasing molecular weight and suitable fractions reacted with the phosphorus sulfide to obtain the desired reaction products. The bottoms resulting from the fractionation of the polymer which have Saybolt Universal viscosities at 210° F. ranging from about 50 seconds to about 10,000 seconds are well suited for this purpose.

Essentially paraffinic hydrocarbons, such as bright stock residuums, lubricating oil distillates, petrolatums, or paraffin waxes may be used. There can also be employed the condensation products of any of the foregoing hydrocarbons, usually through first halogenating the hydrocarbons and reacting with aromatic hydrocarbons in the present of anhydrous inorganic halides, such as aluminum chloride, zinc chloride, boron fluoride, and the like.

Examples of other high molecular weight olefinic hydrocarbons which can be employed are cetene ($C_{16}$), cerotene ($C_{26}$), melene ($C_{30}$) and mixed high molecular weight alkenes obtained by cracking petroleum oils.

Other preferred olefins suitable for the preparation of the phosphorus sulfide reaction products are olefins having at least 20 carbon atoms in the molecule of which from about 13 carbon atoms to about 18 carbon atoms and preferably at least 15 carbon atoms are in a long chain. Such olefins can be obtained by the dehydrogenation of alkyl halides, preferably long chain alkyl halides, particularly halogenated paraffin waxes.

As a starting material there can be used the polymer or synthetic lubricating oil obtained by polymerizing unsaturated hydrocarbons resulting from the vapor phase cracking of paraffin waxes in the presence of aluminum chloride which is fully described in U.S. Patents 1,995,-260, 1,970,402 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. The reaction products of the phosphorus sulfide and the polymers resulting from the voltolization of hydrocarbons as described, for example, in U.S. Patents 2,197,768 and 2,191,787 are also suitable.

Other hydrocarbons that can be reacted with a phosphorus sulfide are aromatic hydrocarbons, such as for example, benzene, naphthalene, toluene, zylene, diphenyl and the like, or an alkylated aromatic hydrocarbon, such as for example, benzene having an alkyl substituent having at least 4 carbon atoms and preferably at least 8 carbon atoms, such as a long chain paraffin wax.

The unneutralized hydrolyzed reaction product of the phosphorus sulfide and the normally liquid hydrocarbon is prepared by reacting the hydrocarbon with from about 5% to about 50%, preferably from about 10% to about 25% of a phosphorus sulfide, e.g., $P_2S_5$, at a temperature of from about 200° F. to about 600° F., particularly at a temperature of from 325° F. to about 500° F., while maintaining a non-oxidizing atmosphere, such as for example, an atmosphere of nitrogen above the reaction mixture. It is advisable to use as much phosphorus sulfide as can react with the hydrocarbon in order to fully utilize all of the latter. For practical purposes, it is preferred to employ the phosphorus sulfide and the hydrocarbon in the mole ratio of 1:2. The use of greater amounts of the phosphorus sulfide results in unused sulfide which confers no advantage. The reaction mixture is then hydrolyzed by steaming or other suitable means, at a temperature of from about 220° F. to about 500° F., and preferably at a temperature of from about 300° F. to about 400° F. During the hydrolysis step, it is desirable to control the evolution of heat by suitable means to maintain a temperature below about 420° F. Due to the formation of inorganic phosphorus acids and organic phorphorus acids formed by the hydrolysis, the acidity of the hydrolyzed material is markedly increased, often reaching as much as 160 milligrams of KOH per gram of product, and higher. The hydrolyzed product thus obtained may be used in the present invention. However, it is preferable to purify the hydrolyzed product in the following manner.

The hydrolyzed reaction product is contacted or mixed with from about 1% to about 30% of a suitable adsorbent clay, such as Attapulgus clay, and the mixture agitated, such as by blowing with an inert gas for a period of from about one-half hour to about six hours while maintaining a temperature of from about 200° F. to about 400° F. To facilitate adequate mixing and contacting, it is desirable to thin or dilute the mixture by the addition of a suitable diluent; where the reaction product is to be used ultimately as a lubricant oil additive the diluent may be a hydrocarbon oil of suitable viscosity. After being contacted for the desired length of time at the selected temperature, the mixture is then filtered by suitable means, for example, by means of a filter press, and a filtrate substantially free of inorganic phosphorus acid obtained.

The preparation of the unneutralized hydrolyzed reaction product of a phosphorus sulfide and medial olefins is illustrated by the following examples:

EXAMPLE I

A mixture of 644 g. (2 moles) 11-tricosene and 222 g. (1 mole) $P_2S_5$ was stirred and heated at 450° F. for 1 hour. All the $P_2S_5$ had reacted by this time. The product was steamed at 300° F. for 3½ hours, contacted with 100 g. Attapulgus clay fines at 300° F. for 1 hour, and filtered through celite, giving 722 g. brown viscous product containing 10.55% sulfur, 6.64% phosphorus, having a molecular weight of 930, an acidity of 94.55 mg. as KOH, and a viscosity of 553.6 SSU at 210° F.

EXAMPLE II

A mixture of 735 g. (1.5 moles) 17-pentatriacontene and 166 g. (0.75 mole) $P_2S_5$ was stirred at 450° F. for 1½ hours, steamed at 300° F. for 3½ hours, cooled, diluted with 800 ml. hexane and 500 ml. isopropyl ether, washed with 2 liters water, and evaporated, giving 745 g. brown, very viscous product analyzing 9.87% sulfur, 4.72% phosphorus, 1200 molecular weight, and acidity of 61.29 mg. as KOH.

Lubricant compositions containing the unneutralized hydrolyzed reaction products of a phosphorus sulfide and a medial olefin, as above defined, are described and claimed in my co-pending application Serial No. 619,384, filed October 31, 1956.

The following examples illustrate the preparation of the unneutralized hydrolyzed reaction products of a phosphorus sulfide and normally liquid hydrocarbons, other than medial olefins.

EXAMPLE III

A mineral lubricating oil derived from a so-called Winkler crude oil, and having a gravity of 25.6 A.P.I., a Saybolt Universal viscosity at 100° F. of 285 to 300 seconds, a flash of not less than 400° F. and a pour point of —5° F. was mixed with 9% of phosphorus pentasulfide and the mixture heated at a temperature of from 100° F. to 400° F. for about three hours and maintained at the maximum temperature for an additional hour. The reaction product was then diluted with 50% of an SAE 20 motor oil and blown with steam at a temperature of 340–350° F. for about three hours.

EXAMPLE IV

A cracked cycle stock, recovered as bottoms from a bubble tower, and having a Saybolt Universal viscosity at 100° F. of 53 seconds, a gravity of 23.2 A.P.I., an initial boiling point of 408° F., and a 900% distillation point of 734° F., was mixed with 9% of phosphorus pentasulfide and the mixture heated at a temperature of from about 300–400° F. The mixture was then dissolved in hexane, filtered, and the filtrate distilled to remove the hexane. The product was then diluted with 50% of an SAE–20 motor oil and blown with steam at a temperature of 340–380° F. until substantially no hydrocarbon sulfide was evolved.

EXAMPLE V

A butylene polymer of about 700 molecular weight was reacted with 15% $P_2S_5$ at a temperature of about 400° F. to about 420° F., and the reaction product diluted with an equal volume of SAE–10 base oil. The diluted product was then hydrolyzed with steam at a temperature of about 400° F. until the acidity of the product remained substantially constant at 55 mg. KOH/gram of product with continued steaming. The hydrolyzed product was then contacted with 7.5% No. 1 Attapulgus clay fines for two hours at 355° F. and the clay was then filtered off.

EXAMPLE VI

A butylene polymer having a molecular weight of about 700 was reacted with a mixture of 16.6% $P_2S_5$ and 2.4% sulfur at temperature of 400° F. to 410° F. for a period of 10 hours. The reaction product was then hydrolyzed with steam at a temperature of 370° F. to 398° F. for a period of 5½ hours under a constant acidity of 123 milligrams of KOH per gram of product was obtained. The hydrolyzed product was then contacted with 14.6% Attapulgus clay fines for a period of twenty hours during which time the temperature ranged from 340° F. to 220° F. and then filtered.

EXAMPLE VII

A mixture of 375 g. butylene polymer of 750 molecular weight and 55.5 g. $P_2S_5$ was stirred at 400–425° F. for 6 hours, steamed at 350–375° F. for 4 hours, stirred with 25 g. Attapulgus clay fines at 300° F. for 4 hours, and filtered, giving 392 g. product analyzing 1.3% S., 2.24% P., having an acidity of 35.6 mg. KOH/gram of product, and a viscosity of 442 SSU at 210° F.

EXAMPLE VIII

The acidic product of Example VII was neutralized with about 32% (based on the $P_2S_5$-butylene polymer reaction product) of a 30% solution of barium hydroxide at a temperature of 350° F.–375° F. and then filtered through a Sweetland filter press. The neutralized product contained 1.06% sulfur, 5.37% barium and 1.91% phosphorus.

In the preparation of the alkaline earth, preferably barium, salt of the mixture of the acidic hydrolyzed reaction product of a phosphorus sulfide and a normally liquid hydrocarbon, other than medial olefins, and of the acidic hydrolyzed reaction product of a phosphorus sulfide and a medial olefin, a mixture consisting of about 80–90% of the former and about 20–10% of the latter is reacted with an excess of a basic compound of the alkaline earth, such as barium hydroxide, in the presence of about 5–10% methanol at about 120° F.–140° F. for about 2–5 hours, and the reaction mixture then blown with nitrogen at about 300° F. for about 0.5 to 2 hours. The blown product is then filtered, such as through celite. To decrease the viscosity of the reaction mass a suitable diluent such as a low viscosity hydrocarbon oil or other high boiling hydrocarbon diluent, can be used.

The preparation of the alkaline earth salt of the herein described mixture is illustrated by the following examples.

EXAMPLE IX

A mixture of 40 grams of the hydrolyzed reaction product of Example VII, 10 grams of the hydrolyzed reaction product of Example II, 20 grams of an SAE-5W petroleum motor oil, 15 grams barium hydroxide monohydrate and 10 cc. methanol was stirred and refluxed for 3 hours. The product was then blown with nitrogen at 300° F. for one hour and filtered through celite. The filtrate was a clear brown viscous oily material containing 9.94% barium and 1.70% phosphorus.

EXAMPLE X

This product was prepared as in Example VIII but using 45 grams of the hydrolyzed product of Example VII and 5 grams of the hydrolyzed product of Example II. The resultant neutralized reaction product contained 9.36% barium and 1.60% phosphorus.

EXAMPLE XI

A mixture of 40 grams of the hydrolyzed product of Example VII, 10 grams of the hydrolyzed product of Example I, 90 grams of an SAE-5W petroleum motor oil, 18 grams $Ba(OH)_2 \cdot H_2O$ and 10 cc. methanol was stirred and refluxed for 3 hours. The product was then blown with nitrogen at 300° F. for one hour and filtered through celite. The filtrate was a clear brown viscous oily material containing 5.84% barium and 0.90% phosphorus.

EXAMPLE XII

This product was prepared as in Example X but using 45 grams of the hydrolyzed product of Example VII, 5 grams of the hydrolyzed product of Example I and 16 grams $Ba(OH)_2 \cdot H_2O$. The product obtained was a clear brown oily product containing 5.6% barium and 0.94% phosphorus.

The detergency effect of the herein described invention is demonstrated by the data in Table I. These data were obtained by subjecting a solvent extracted SAE-30 base hydrocarbon oil containing the products of this invention to the following oxidation test referred to as I.S.O.T. test. In this test, 250 cc. of the subject oils are heated at 330° F. in a 500 cc. glass beaker in the presence of 5 square millimeters of copper and 10 square millimeters of iron. Four glass rods of 6 millimeters diameter are suspended in the test oils which are stirred at about 1300 r.p.m. by means of a glass stirrer. At intervals of 24, 48, and 72 hours, oil samples are taken for sludge and varnish determinations. The varnish is determined by visual inspection of the glass rods, a rod free of varnish being rated 10 and a heavily varnish-coated rod being rated 1. The following samples were subjected to this test:

Sample A—Solvent extracted SAE-30 base oil (control).
Sample B—A+5.44% of barium hydroxide neutralized reaction product of Example VIII.
Sample C—A+5.44% product of Example IX.
Sample D—A+10.88% product of Example XII.

*Table I*

| | Varnish | | | Naphtha Insoluble (mg.) | | |
|---|---|---|---|---|---|---|
| | 24 | 48 | 72 | 24 | 48 | 72 |
| A | 8 | 6 | 1 | 0.13 | 5.00 | 6.71 |
| B | 10 | 10 | 9 | 0.43 | 1.86 | 2.64 |
| C | 10 | 10 | 10 | 0.36 | 0.58 | 1.7 |
| D | 10 | 10 | 10 | 0.43 | 0.86 | 1.8 |

The rust inhibiting properties of the products of the present invention is demonstrated by the data in Table II. These data were obtained by the following test: three hundred cubic centimeters of the oil to be tested are placed in a 400 cc. lipless glass beaker and heated to 140° F. in an oil bath and the oil agitated with a stirrer maintained at about 1000 r.p.m. When the temperature of the oil reaches 140° F. a cleaned strip of cold rolled steel is suspended in the oil and stirring continued for 30 minutes. Thirty cubic centimeters of distilled water are then carefully added by pouring it down the side of the beaker and stirring continued for 24 hours. At the end of this period, the test piece is removed from the beaker, washed with naphtha, and visually inspected for the presence of rust. This method is fully described in the A.S.T.M. Manual of 1953, page 292, and identified as A.S.T.M. Method D665–53T.

An extension of the above test is the so-called "film tenacity test" which measures the tenacity of the inhibitor film on metal surfaces and the ease with which it is removed by water. The test is conducted as follows: at the end of the 24-hour period of the above A.S.T.M. Method D665–53T, the oil in the beaker is replaced with 300 cc. distilled water, and stirring continued at 140° F. for an additional 24 hours. At the end of this period, the test piece is removed, rinsed with acetone and visually inspected for rust. This test is particularly severe since there is no reservoir of inhibitor-containing oil.

The following samples were subjected to the above described tests:

Sample A'—SAE-30 base oil+5.44% product of Example VIII.
Sample B'—SAE-30 base oil+5.44% product of Example IX.

Sample C'—SAE-30 base oil+5.44% product of Example X.
Sample D'—SAE-30 base oil+10.88% product of Example XI.

Table II

| Sample | Rusting | |
|---|---|---|
| | D-665 Test | Film Tenacity Test |
| A'. | Moderate | Severe. |
| B'. | None | None. |
| C'. | do | Do. |
| D'. | do | Do. |

The data in Tables I and II demonstrate the good detergency and rust-inhibiting properties of the product of the present invention. While the product of Example VIII showed good detergency characteristics, it was not an effective rust inhibitor. The hydrolyzed reaction product of a phosphorus sulfide and a medial olefin of the type herein described neutralized with a basic alkaline earth compound such as barium hydroxide, forms a gel which is insoluble in hydrocarbon oils and other organic solvents. The addition of the product of Example VIII did not cause this gel to dissolve in oil. The data demonstrate that to obtain a product having both detergency and anti-rust properties, the acidic hydrolyzed phosphorus sulfide-hydrocarbon reaction product and the acidic hydrolyzed phosphorus sulfide-medial olefin reaction product must be neutralized in admixture with each other as herein described.

Percentages given herein and in the appended claims are weight percentages unless otherwise stated.

In addition to the herein described addition agents, the compositions can contain other additives such as antioxidants, pour point depressors, E.P. agents, anti-wear agents, V.I. improvers, etc.

While this invention has been described in connection with the use of the herein described addition agents in lubricant compositions, their use is not limited thereto, since the same can be used in fuel oils, greases, nondrying animal and vegetable oils, and naphthas. In addition to their use in mineral lubricating oils, the herein described additives of the present invention can be used in synthetic oils such as those obtained by the polymerization of normally gaseous hydrocarbons, synthetic lubricating oils of the polyalkylene oxide type for example the "Ucon oils" marketed by Carbide and Carbon Corporation, the polycarboxylic acid ester-type oils, such as the esters of adipic, sebacic, azelaic acids, and others.

Concentrates of a suitable oil base containing more than 20% of the additives of the present invention can be used for blending with other suitable oils in the proportions desired for the particular conditions of use to give a finished product containing from about 0.5% to about 20% of the additive.

While I have described the invention by reference to specific preferred embodiments thereof, the invention is not to be considered as limited thereto, but includes within its scope such modifications and variations as come within the spirit of the appended claims.

I claim:

1. A lubricant composition comprising a major proportion of an oleaginous lubricating vehicle and from about 0.5% to about 20% of an oil-soluble alkaline earth-containing neutralized acidic mixture consisting of from about 80% to about 90% of a hydrolyzed reaction product of a phosphorus sulfide and a normally liquid hydrocarbon, other than a medial olefin, and from about 10% to about 20% of a hydrolyzed reaction product of a phosphorus sulfide and a medial olefin having the general formula

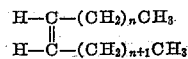

wherein $n$ is an integer of from about 8 to about 20 inclusive, said neutralized hydrolyzed phosphorus sulfide-hydrocarbon reaction products being obtained by reacting about two moles of the hydrocarbon with about one mole of the phosphorus sulfide at a temperature of from about 200° F. to about 600° F., hydrolyzing the resultant reaction products at a temperature of from about 220° F. to about 500° F., and neutralizing said hydrolyzed reaction products in admixture with a basic alkaline earth compound.

2. A lubricant composition as described in claim 1 in which the hydrocarbon is an olefin polymer.

3. A lubricant composition as described in claim 1 in which the alkaline earth is barium.

4. A lubricant composition comprising a major proportion of a hydrocarbon lubricating oil and from about 0.5% to about 20% of an oil-soluble barium-containing neutralized acidic mixture consisting of from about 80% to about 90% of a hydrolyzed reaction product of a phosphorus sulfide and a butylene polymer and from about 10% to about 20% of a hydrolyzed reaction product of a phosphorus sulfide and a medial olefin having the general formula

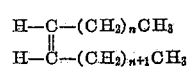

wherein $n$ is an integer of from about 8 to about 20, said butylene polymer and said medial olefin being reacted with said phosphorus sulfide in the mole ratio of 2:1 respectively at a temperature of from about 200° F. to about 600° F., the resultant reaction products hydrolyzed at a temperature of from about 220° F. to about 500° F., and the hydrolyzed reaction products in admixture neutralized with a basic barium compound.

5. A lubricant composition as described in claim 4 in which the phosphorus sulfide is phosphorus pentasulfide.

6. A lubricant composition as described in claim 4 in which the medial olefin is 11-tricosene.

7. A lubricant composition as described in claim 4 in which the medial olefin is 17-pentatriacontene.

References Cited in the file of this patent

UNITED STATES PATENTS

| 2,316,090 | Kelso et al. | Apr. 6, 1943 |
| 2,476,813 | Buckmann et al. | July 19, 1949 |
| 2,516,119 | Hersh | July 25, 1950 |
| 2,647,889 | Watson et al. | Aug. 4, 1953 |

UNITED STATES PATENT OFFICE
CERTIFICATE OF CORRECTION

Patent No. 2,893,959  
July 7, 1959

Ellis K. Fields

It is hereby certified that error appears in the printed specification of the above numbered patent requiring correction and that the said Letters Patent should read as corrected below.

Column 1, line 71, after "such" insert -- as --; column 2, line 13, for "about -8° F. to" read -- about -80° F. to --; column 3, line 23, for "zylene" read -- xylene --; column 4, line 50, for "900% distillation" read -- 90% distillation --.

Signed and sealed this 17th day of November 1959.

(SEAL)  
Attest:

KARL H. AXLINE  
Attesting Officer

ROBERT C. WATSON  
Commissioner of Patents